H. F. MARANVILLE.
RUBBER MOLD.
APPLICATION FILED SEPT. 9, 1918.
1,350,105.
Patented Aug. 17, 1920.
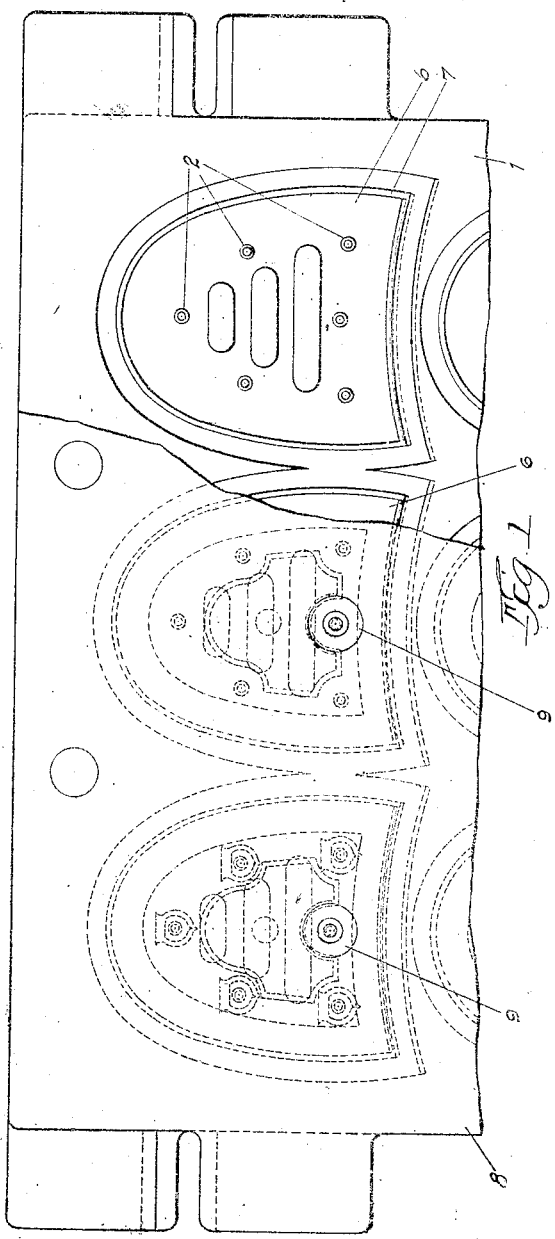
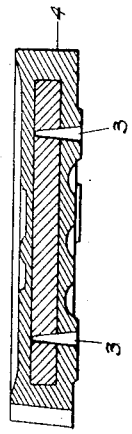
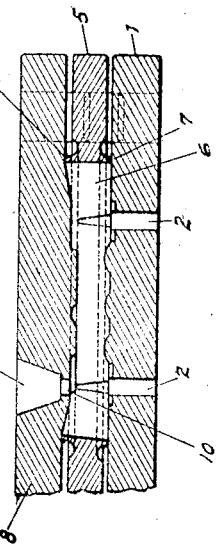
Witness:
Inventor
Harvey F. Maranville
By G. L. Ely
Atty.

UNITED STATES PATENT OFFICE.

HARVEY F. MARANVILLE, OF AKRON, OHIO, ASSIGNOR TO THE FIRESTONE TIRE & RUBBER COMPANY, OF AKRON, OHIO, A CORPORATION OF OHIO.

RUBBER-MOLD.

1,350,105.  Specification of Letters Patent.  Patented Aug. 17, 1920.

Application filed September 9, 1918. Serial No. 253,155.

*To all whom it may concern:*

Be it known that I, HARVEY F. MARANVILLE, a citizen of the United States, residing at Akron, in the county of Summit, State of Ohio, have invented certain new and useful Improvements in Rubber-Molds, of which the following is a specification.

In the manufacture of molded articles of rubber or similar compositions, it has been the practice to allow the mold to open slightly so that the excess rubber may escape around the edges of the mold making a fin or bur around the edges of the finished article, which has to be trimmed away before the article can be placed on the market. The trimming of the molded article is an expensive operation and it is the purpose of this invention to obviate entirely the necessity for this work.

I propose to accomplish this purpose by a design of mold construction which will cause all of the excess rubber in the mold to be forced out at one point and to provide the mold with sharp, tight-fitting edges so that a clean finish will be given to the article, and the overflow, or excess rubber will, as a general rule, remain with the mold when the article is removed. If the overflow does not entirely come off with the mold, only a slight remnant will be left which may be easily removed or is sufficiently obscure to be left on the article.

The invention is shown in connection with a gang heel mold, but it is not limited to the manufacture of these articles as the principles are applicable to any molds for the manufacture of any articles of rubber or other materials, nor is it limited to the precise details of construction, as these may be varied within wide limits without departing from the scope of the invention.

In the drawings is shown a portion of a rubber heel mold constructed in accordance with the invention in which—

Figure 1 is a plan view of a fragment of a gang mold.

Fig. 2 is a cross section through one unit of the mold.

Fig. 3 is a finished rubber heel in section.

In the drawings 1 represents the bottom plate of the mold which carries a number of designs embossed thereon to shape the lower, or ground side of the heel, each design being provided with a series of pins 2 which form the nail holes 3 in the finished heel 4. These pins serve as a support for the washers which may be inserted in the heel if desired.

The central plate is designated at 5 and is provided with a series of cavities 6 of the shape of the article to be molded, the cavities being surrounded by a raised wall or beading 7 having sharp outer edges designed to fit closely the upper and lower mold plates so that no rubber may escape at these points and a clean sharp outline will be given to the heel. The edge about the cavity is raised slightly above the main portion of the central plate to insure a tight fit at all points.

The upper mold plate is shown at 8 and is formed with a series of designs to form the upper or shoe surface of the heel, and at any convenient point is provided with a vent or overflow cavity 9, the lower end of which is formed with a restricted opening 10 which communicates with the interior of the mold cavity.

When the stock is placed in the mold and the mold in the press the excess rubber, instead of seeking a vent around the edges of the mold, will pass up through the vent 10 into the cavity 9 and out over the upper surface of the mold. When the heel is finished the mold is separated and the overflow comes off the heel with the upper plate leaving a finished heel ready for the market.

With proper changes the same principles may be used in the manufacture of all styles of rubber goods and will result in the production of clean articles without the presence of the objectionable fin due to overflow. Other changes will suggest themselves to those familiar with the art without departing from the spirit of the invention or sacrificing any of its benefits.

I claim:

1. A mold for rubber heels or the like comprising top and bottom plates, a central plate provided with a cavity, passing through the plate, a raised edge about said cavity having a tight fit with the surfaces of said top and bottom plates and a vent located in one of said plates and communicating with the mold cavity.

2. A mold for rubber heels or the like comprising top and bottom plates, a central plate provided with a cavity passing through the plate, a raised edge about said cavity having a tight fit with the surfaces of said top and bottom plates, and a vent located in the top plate and communicating with the mold cavity.

3. A mold for rubber heels or the like comprising top and bottom plates, a central plate provided with a cavity passing through the plate, the walls about said cavity having close fitting contact with said top and bottom plates, and a vent located in one of said plates and communicating with the mold cavity.

HARVEY F. MARANVILLE.